United States Patent [19]

Acker

[11] 4,004,557
[45] Jan. 25, 1977

[54] PISTON-CYLINDER ASSEMBLY
[76] Inventor: Otto H. Acker, Box 2, Washougal, Wash. 98671
[22] Filed: June 4, 1975
[21] Appl. No.: 583,684
[52] U.S. Cl. .................... 123/65 VC; 123/32 B; 123/32 VN; 123/73 R; 123/193 H
[51] Int. Cl.$^2$ ..................... F02D 39/04
[58] Field of Search ........... 123/32 B, 32 C, 32 D, 123/33 B, 33 C, 32 VN, 65 R, 65 VC, 73 R, 193 R, 193 H, 193 C, 193 CP, 193 CH

[56] References Cited

UNITED STATES PATENTS

| 1,165,059 | 12/1915 | Berliner | 123/65 VC |
| 1,725,418 | 8/1929 | Prindle | 123/65 VC |
| 1,872,761 | 8/1932 | Leonard | 123/33 B |
| 2,505,999 | 5/1950 | Smith | 123/32 B |
| 2,511,992 | 6/1950 | Quick | 123/32 B |
| 2,655,906 | 10/1953 | Udale | 123/65 VC |
| 2,962,009 | 11/1960 | Buchi | 123/65 VC |

FOREIGN PATENTS OR APPLICATIONS

| 1,150,109 | 1/1958 | France | 123/32 VN |
| 420,281 | 4/1924 | Germany | 123/32 VN |

Primary Examiner—Wendell E. Burns
Assistant Examiner—David D. Reynolds
Attorney, Agent, or Firm—Eugene M. Eckelman

[57] ABSTRACT

A cylinder for a reciprocating piston has a depending cup-like extension leading into the firing chamber, and this extension provides a mounting for a valve accomplishing both inlet of fuel and scavenging of exhaust gases. The valve has a longitudinal bore through which the fuel is admitted to the firing chamber. The top wall of the piston has a tubular baffle extending in a direction opposite from the skirt portion of the piston to protect the cylinder from solid particles.

1 Claim, 2 Drawing Figures

PISTON-CYLINDER ASSEMBLY

BACKGROUND OF THE INVENTION

This invention relates to new and useful improvements in piston-cylinder assemblies for internal combustion engines.

Piston-cylinder assemblies for internal combustion engines utilize inlet means for the fuel, which may comprise inlet nozzles for fuel injection apparatuses or inlet valves for the carburetor type apparatus, as well as exhaust valve. Such conventional constructions thus require individual mounting means for the fuel inlet as well as for the exhaust control. Also, in conventional piston-cylinder assemblies, the cylinder portion extends up into the firing chamber wherein when firing occurs, the combustion as well as solid by-products thereof impinge against the cylinder walls, thus causing damage as well as depositing solid particles on the cylinder walls so that such particles are picked up by the piston to cause undue wear thereon.

SUMMARY OF THE INVENTION

According to the present invention and forming a primary objective thereof, a piston-cylinder assembly is provided which is deemed to improve on existing types of piston-cylinder assemblies. For this purpose, the cylinder assembly has a cup-like extension extending down into the firing chamber and such extension provides a mounting arrangement for fuel inlet and exhaust means. According to the invention, a single exhaust valve is provided for the piston-cylinder assembly, and this valve has a bore therein through which fuel is admitted. The cup-like extension according to its dimensions can also be used to vary the compression ratio of the cylinder. The piston-cylinder assembly also has an integral baffle extending from the top wall of the piston to protect the cylinder from solid particles.

The invention will be better understood and additional objects and advantages will become apparent from the following description taken in connection with the accompanying drawings which illustrate a preferred form of the device.

DETAILED DESCRIPTION OF A PREFERRED EMBODIMENT

Figures 1, 2:
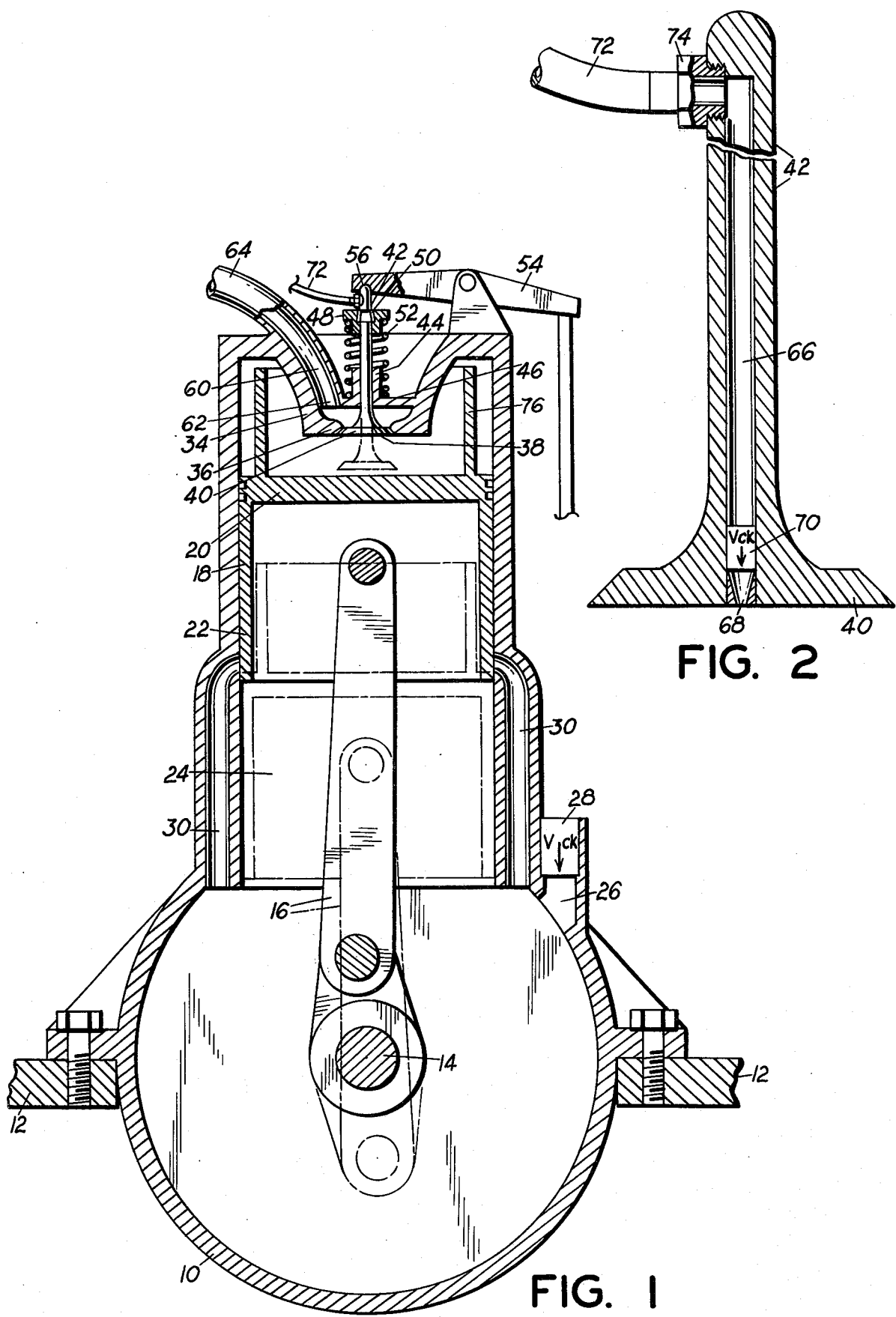
FIG. 1 is a cross sectional view of a piston-cylinder assembly embodying features of the present invention.
FIG. 2 is an enlarged sectional view of a novel valve in the assembly.

With particular reference to the drawings, the numeral 10 designates the crankcase of a conventional two stroke internal combustion engine. Such a crankcase has suitable engine mounts 12 and is associated with a crankshaft 14 and a piston rod 16 connected to a piston 18 which although of novel construction, as will be described hereinafter, employs the usual top wall 20 and a depending skirt 22.

Crankcase 10 has communication with a cylinder 24 in which the piston 18 operates. An air inlet 26 leads into the crankcase and has the usual check valve 28. The crankcase has a plurality of vertical passageways 30 therearound which extend between the crankcase and the cylinder 24. In the usual two stroke construction, air is drawn in through inlet 26 in the upstroke of the piston and is forced upwardly into an upper portion of the cylinder in the downstroke of the piston, the top wall 20 of the piston being below the upper outlet of passageways 30 in its lowermost position to allow air in the crankcase to escape to the upper portion of the cylinder. Air can be forcefully admitted through inlet 26 if supercharging is desired. As the piston moves upwardly, it accomplishes the usual scavenging of exhaust gases and then compresses the air and the fuel mixture for firing. The piston at its uppermost position is shown in full lines in FIG. 1 and is shown in broken lines in its lowermost position.

According to the present invention, the cylinder at its upper end is provided with a depending cup-like extension 34 which is of smaller diameter than the upper portion of the cylinder. Extension 34 has a bottom wall 36 with a valve opening or seat 38 therein for a valve 40 having a stem 42. Stem 42 has guided slidable movement in a bushing 44 supported in a cross wall in the cup-like extension. The stem 42 carries a collar 48 locked in place by a lock ring 50, and a compression spring 52 is disposed between bushing 44 and the collar 48 to maintain the valve in its upper or seated position. This valve is associated with the usual rocker arm 54 operated in timed sequence from the usual cam shaft, not shown. The upper end of the valve stem 42 seats in a recess 56 in the rocket arm 54 to provide the drive connection, between the valve and the rocker arm. An exhaust outlet passageway 60 leads from an opening 62 in the wall 46 and is connected to an exhaust manifold 64 for discharging exhaust gases.

The valve 40 serves in its seated and unseated positions as shown respectively in full and broken lines in FIG. 1 to accomplish compression, firing and exhaust functions, and according to the invention and with particular reference to FIG. 2, this valve also serves to direct fuel into the firing chamber. For this purpose, the valve has a longitudinal bore 66 therethrough, FIG. 2, which opens through the bottom of the valve in a restricted orifice 68 associated with a check valve 70 and which communicates at the upper end thereof with a conduit 72 through a suitable fitting 74. The arrangement of fuel inlet would best be suited for Diesel engines or arrangements where fuel is injected. For this reason, fuel igniting means, such as a spark plug, is not shown or described, although it is to be understood that the present piston-cylinder assembly could be used with an engine requiring fuel igniting means.

The operation of the present piston-cylinder assembly is a conventional two-stroke operation, namely the cylinder 18 draws in air through inlet 26 into the crankcase in its upstroke and also accomplishes the usual scavenging and compression of air-fuel mixture in the firing chamber. As the piston is forced downwardly, the air in the crankcase is compressed, and when the top of the piston reaches a point below the upper end of passageways 30, the compressed air rushes upwardly above the piston to start the scavenging operation. The operation of the valve 40 and fuel intake sequence is conventional and therefore not detailed herein.

Also, according to the present invention, the top wall 20 of the piston has a tubular baffle or extension 76 which projects upwardly so that in the upper position of the piston it is just short of the top of the firing chamber. The outer diameter of this tubular baffle is of less dimension than the outer diameter of the piston in order to allow air from passageways 30 in the down position of the piston to pass upwardly through the firing chamber when the piston is positioned in its downstroke. The tubular baffle 76 is formed of a high melt metal so as to readily withstand the heat conditions in this area and is cooled by the flow of air from the upper openings of passageways 30 each time the piston moves to its lowermost position. In addition, this baffle confines the combustion and serves to protect the cylinder walls from the solid particles of combustion. That is, instead of the solid particles of combustion being blown outwardly against the cylinder and reaching the sliding surface of the piston, they will be mostly confined within the baffle 76 and be ejected through outlet passageway 60 without causing harm to the piston, thus providing for a longer piston and cylinder life. Since the baffle 76 confines the products of combustion, it will also confine the inlet of fuel and thus the engine is particularly useful as a solid fuel burning engine such as one that burns coal dust, charcoal, etc.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:
1. A piston-cylinder assembly for internal combustion engines comprising a cylinder having cylinder walls and means defining a top firing chamber, a crankcase communicating with said cylinder, a drive shaft in said crankcase, a piston in said cylinder operably connected to said drive shaft and arranged for reciprocating movement in said cylinder between upper and lower positions, a cup-like extension in said cylinder depending into said firing chamber, said piston having a top end wall, a depending skirt portion integral with said end wall and an upwardly extending tubular baffle integral with said end wall, said tubular baffle being of smaller diameter than said piston but of larger diameter than said cup-like extension whereby to receive the latter in the upper position of said piston, valve means mounted in said extension and cooperating with said cylinder for controlling the inlet of fuel and for scavenging exhaust gases, air passageway means extending from said crankcase to an upper portion of said cylinder which is above the top end wall of said piston and in the area of said baffle in said down position of said piston, and valve controlled air inlet means in said crankcase.

* * * * *